US011960336B2

(12) United States Patent
Chen et al.

(10) Patent No.: US 11,960,336 B2
(45) Date of Patent: Apr. 16, 2024

(54) METHOD OF TEMPERATURE CONDITIONING COMPUTE MODULE FOR COLD START

(71) Applicant: Waymo LLC, Mountain View, CA (US)

(72) Inventors: Darren Chen, Sunnyvale, CA (US); Sabareeshkumar Ravikumar, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/662,334

(22) Filed: May 6, 2022

(65) Prior Publication Data

US 2023/0359254 A1 Nov. 9, 2023

(51) Int. Cl.
*G06F 1/20* (2006.01)
*G06F 1/08* (2006.01)
*G06F 1/3206* (2019.01)

(52) U.S. Cl.
CPC ............... *G06F 1/206* (2013.01); *G06F 1/08* (2013.01); *G06F 1/3206* (2013.01)

(58) Field of Classification Search
CPC ....................................................... G06F 1/206
See application file for complete search history.

(56) References Cited

U.S. PATENT DOCUMENTS 8,095,332 B2 1/2012 Hsieh
8,176,308 B2 5/2012 Chiu
(Continued)

FOREIGN PATENT DOCUMENTS

CN 101763302 6/2010
CN 10825528 8/2021
(Continued)

OTHER PUBLICATIONS

Kevin Skadron, et al., "Temperature-Aware Computer Systems: Opportunities and Challenges," IEEE Computer Society, 2003 IEEE, downloaded on Feb. 16, 2022 from IEEE Xplore.
(Continued)

*Primary Examiner* — Suresh Suryawanshi
(74) *Attorney, Agent, or Firm* — McDonnell Boehnen Hulbert & Berghoff LLP

(57) ABSTRACT

Example embodiments relate to methods of increasing a temperature of a computer module to start the computer at environmental temperatures below a threshold temperature. An example embodiment includes receiving, at one or more computing components thermally coupled to a main computer via a liquid-cooled plate, a set of program instructions. The method can also include running the set of program instructions on at least one computing component. Running the set of program instructions on the computing component can generate heat that flows to the main computer via the liquid-cooled plate. The method can additionally include detecting, from at least one thermal sensor coupled to the liquid-cooled plate, a temperature reading indicative of a temperature of the main computer. The method can further include determining that the temperature reading has reached a predetermined temperature threshold and based on the temperature reading reaching the predetermined temperature threshold, powering on the main computer.

20 Claims, 13 Drawing Sheets

(56) References Cited

U.S. PATENT DOCUMENTS

| | | |
|---|---|---|
| 8,745,367 B2 | 6/2014 | Wang et al. |
| 8,762,702 B2 | 6/2014 | Belady et al. |
| 8,972,709 B2 | 3/2015 | Chiu |
| 9,736,887 B2 | 8/2017 | Chiu et al. |
| 10,871,813 B2 | 12/2020 | Pan et al. |
| 10,957,624 B2 | 3/2021 | Chen et al. |
| 10,989,103 B2 | 4/2021 | Smith |
| 2008/0296397 A1* | 12/2008 | Cheng .................. G06F 1/206 237/2 R |
| 2009/0198387 A1* | 8/2009 | Lin ........................ G06F 1/26 713/2 |
| 2010/0070745 A1* | 3/2010 | Chiu ..................... G06F 1/206 713/2 |
| 2012/0066526 A1* | 3/2012 | Salsbery ............ G06F 1/3203 713/320 |
| 2013/0100599 A1* | 4/2013 | Wang .................. G06F 9/4401 361/679.02 |
| 2013/0138935 A1* | 5/2013 | Belady .................... G06F 9/44 713/1 |
| 2013/0227261 A1* | 8/2013 | Anderson ............. G06F 1/206 713/2 |
| 2017/0280555 A1* | 9/2017 | Chen .................... H01L 23/345 |
| 2018/0004259 A1* | 1/2018 | Kulkarni ................ F25B 21/02 |
| 2021/0344213 A1 | 11/2021 | Yebka et al. |
| 2022/0020400 A1 | 1/2022 | Ning |

FOREIGN PATENT DOCUMENTS

| | | |
|---|---|---|
| CN | 214253050 | 9/2021 |
| CN | 111399563 | 10/2021 |
| CN | 214540653 | 10/2021 |
| WO | WO 2021/358391 | 12/2021 |

OTHER PUBLICATIONS

Aneta Prijic, et al., "Thermal Energy Harvesting Wireless Sensor Node in Aluminum Core PCB Technology," IEEE Sensors Journal, vol. 15, No. 1, Jan. 2015.

* cited by examiner

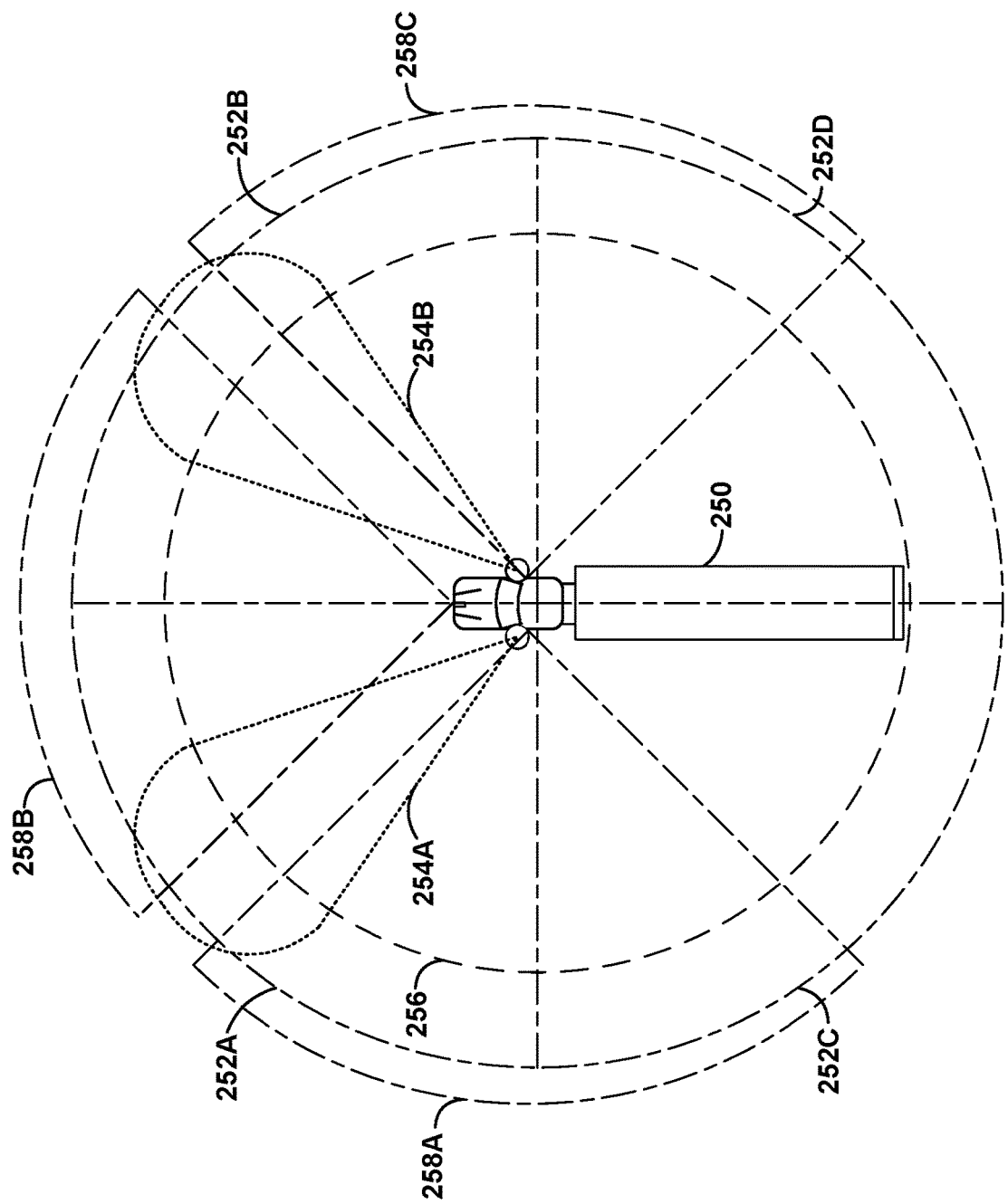

METHOD OF TEMPERATURE CONDITIONING COMPUTE MODULE FOR COLD START

BACKGROUND

Unless otherwise indicated herein, the description in this section is not prior art to the claims in this application and is not admitted to be prior art by inclusion in this section.

Vehicle systems can include onboard computers that are operated in a wide temperature range. To keep components of the onboard computers below a threshold temperature, the computers can include liquid-cooling devices or air-cooling devices. The cooling devices can include a board that the components are positioned on to improve cooling effects.

Additionally, within vehicle onboard computers, there can be integrated circuits, such as CPUs and networking chips that cannot be reliably operated below 0 degrees Celsius, or other specified low temperature. Coolant heaters can be used to push warm fluid into a liquid-cooled onboard computer. Another strategy can be to attach a resistive heater to the surface of the onboard computer.

SUMMARY

Embodiments described herein may relate to methods for increasing a temperature of a computer module so that the computer can be started at environmental temperatures below a threshold temperature. Example embodiments relate to carrying out instructions on a computing component to generate power. The generated power can increase the overall temperature of a computer to start the computer when environmental temperatures are below a threshold temperature. In example embodiments, the operating temperature of the computing component can be lower than the operating temperature of the computer.

In one aspect, a method is provided. The method includes receiving, at one or more computing components, a set of program instructions. The one or more computing components can be thermally coupled to a main computer via a liquid-cooled plate. The method can also include running the set of program instructions on at least one computing component of the one or more computing components. Running the set of program instructions on at least one computing component can generate heat that flows to the main computer via the liquid-cooled plate. The method can additionally include detecting, from at least one thermal sensor coupled to the liquid-cooled plate, a temperature reading indicative of a temperature of the main computer. The method can further include determining that the temperature reading has reached a predetermined temperature threshold and based on the temperature reading reaching the predetermined temperature threshold, powering on the main computer.

In another aspect, a non-transitory, computer-readable medium having instructions stored thereon is provided. The instructions, when executed by a processor, cause the processor to execute a method. The method includes receiving, at one or more computing components, a set of program instructions. The one or more computing components can be thermally coupled to a main computer via a liquid-cooled plate. The method can also include running the set of program instructions on at least one computing component of the one or more computing components. Running the set of program instructions on at least one computing component can generate heat that flows to the main computer via the liquid-cooled plate. The method can additionally include detecting, from at least one thermal sensor coupled to the liquid-cooled plate, a temperature reading indicative of a temperature of the main computer. The method can further include determining that the temperature reading has reached a predetermined temperature threshold and based on the temperature reading reaching the predetermined temperature threshold, powering on the main computer.

In an additional aspect, a computing system is provided. The computing system includes a main computer including a liquid-cooled plate. A plurality of computing components can be thermally coupled to the main computer via the liquid-cooled plate. A plurality of thermal sensors can also be coupled to the liquid-cooled plate. The computing system can further include a controller configured to perform a heating routine. The heating routine includes receiving, at one or more computing components of the plurality of computing components, a set of program instructions. The heating routine also includes running the set of program instructions on the at least one computing component. Running the set of program instructions on the at least one computing component can generate heat that flows to the main computer via the liquid-cooled plate. The heating routine further includes detecting, from at least one thermal sensor coupled to the liquid-cooled plate, a temperature reading indicative of a temperature of the main computer. The heating routine additionally includes determining that the temperature reading has reached a predetermined temperature threshold and based on the temperature reading reaching the predetermined temperature threshold, powering on the main computer.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 2J is an illustration of a field of view for various sensors, according to example embodiments.

DETAILED DESCRIPTION

Figure 1:
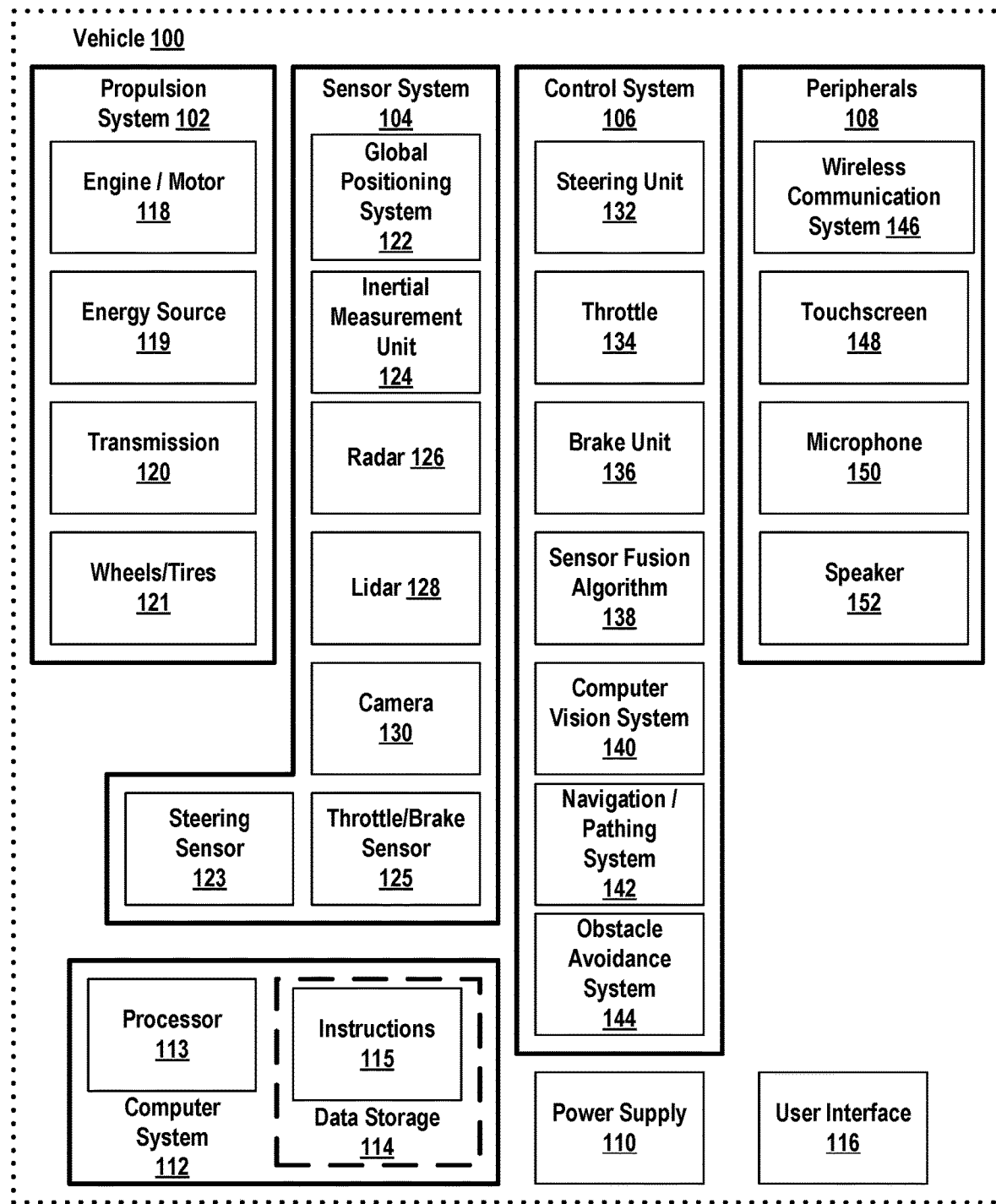
FIG. 1 is a functional block diagram illustrating a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Currently, onboard computers are a component included in many vehicles. Within the vehicle onboard computers, there can be integrated circuits, for example CPUs and networking chips, that cannot reliably operate below 0 degrees Celsius, or other specified low temperatures. In order to operate the vehicle in cold temperatures, the onboard computer can be heated prior to booting. One technique currently used to heat onboard computers is to add coolant heaters to push warm fluid into the liquid-cooled onboard computer. However, the coolant can boil locally at the coolant heater, creating problems and wasting energy. Another method can be to use a resistive heater (copper coils) attached to the surface of onboard computer, but this requires more control circuitry, extra parts, and can create an EMC problem.

Example embodiments presented herein use select integrated circuits capable of low temperature operation (hereinafter referred to as "capable chips") to start heating onboard computers prior to the entire computer booting. Specifically, the onboard computer components with cold sensitive electronics do not have to be powered on, instead only giving power and instructions to PCBAs and capable chips. An example embodiment of one of these capable chips would normally dissipate ~10 W of power in an operational use case. Embodiments can include powering the capable chips and have them dump heat into a thermally-conducting plate coupled to the onboard computer, which in turn can heat and pre-condition the cold-limited chips. In an example embodiment, the thermally-conducting plate can be a liquid-cooled plate, an air-cooled plate, or a heat spreader. The plate can also be made from copper-tungsten, silicon carbide in aluminum matrix, diamond in copper-silver alloy matrix, and/or beryllium oxide in beryllium matrix. Alternatively, a thermal grease, a thermal paste, or thermal epoxy could be applied to the thermally-conducting plate.

Instructions provided to the integrated circuits can also aid in increasing the amount of heat produced. The capable chips can be (i) deliberately overclocked by increasing clock frequency, (ii) have greater voltage applied to the capable chips, (iii) be explicitly put in an operational state of continual clock tree switching, and/or (iv) have some special heating workload fed to them such that they generate maximum heat rather than a normally "useful" computational result. In the synthetic workload, the capable chips can generate 20 W+ per capable chip to heat the thermally-conducting plate and in turn other components in the onboard computer until the onboard computer is ready to boot. These strategies could be applied independent of each other, or together. This solution is advantageous in that it does not require any extra hardware (heaters or control circuitry), but rather uses existing circuitry reconfigured and optimized for heat conditioning the whole system.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, tractor trailers, etc.), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, robot devices, etc. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles, etc.) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), emergency braking, etc.), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e., partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway, etc.) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion, etc.) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118, etc.). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear, etc.).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection, etc.) or in an incoherent detection mode (i.e., time-of-flight mode). In some embodiments, the one or more detectors of the lidar 128 may include one or more photodetectors, which may be especially sensitive detectors (e.g., avalanche photodiodes, etc.). In some examples, such photodetectors may be capable of detecting single photons (e.g., single-photon avalanche diodes (SPADs), etc.). Further, such photodetectors can be arranged (e.g., through an electrical connection in series, etc.) into an array (e.g., as in a silicon photomultiplier (SiPM), etc.). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, a night vision camera, etc.) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve, a carburetor, etc.). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, one or more machine-learned models, etc.) operable to process and analyze images in an effort to determine objects that are in motion (e.g., other vehicles, pedestrians, bicyclists, animals, etc.) and objects that are not in motion (e.g., traffic lights, roadway boundaries, speed-bumps, potholes, etc.). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, interior microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic, etc.) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, control system 106, etc.), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle or semi-autonomous vehicle, etc.) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices, etc.).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g., cameras, etc.), one or more lidars, one or more radars, one or more inertial sensors, one or more humidity sensors, one or more acoustic sensors (e.g., microphones, sonar devices, etc.), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; one or more lidars, cameras, and radars; etc.).

Note that the number, location, and type of sensor systems (e.g., 202, 204, etc.) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, to adapt to specialized environmental or application circumstances, etc.). For example, the sensor systems (e.g., 202, 204, etc.) could be disposed in various other locations on the vehicle (e.g., at location 216, etc.) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, inertial sensors, humidity sensors, and acoustic sensors (e.g., microphones, sonar devices, etc.). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar sensors. For example, the lidar sensors could include a plurality of light-emitter devices arranged over a range of angles with respect to a given plane (e.g., the x-y plane, etc.). For example, one or more of the sensor systems 202, 204, 206, 208, 210, 212, 214, and/or 218 may be configured to rotate or pivot about an axis (e.g., the z-axis, etc.) perpendicular to the given plane so as to illuminate an environment surrounding the vehicle 200 with light pulses. Based on detecting various aspects of reflected light pulses (e.g., the elapsed time of flight, polarization, intensity, etc.), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz, etc.). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208, 210, etc.), to actively scan the environment near the back of the vehicle 200 for the presence of radio-reflective objects. Similarly, one or more radars can be located near the front of the vehicle 200 (e.g., sensor systems 212, 214, etc.) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors, etc.) used to sense a surrounding environment of vehicle 200. Acoustic sensors may include microphones (e.g., piezoelectric microphones, condenser microphones, ribbon microphones, microelectromechanical systems (MEMS) microphones, etc.) used to sense acoustic waves (i.e., pressure differentials) in a fluid (e.g., air, etc.) of the environment surrounding the vehicle 200. Such acoustic sensors may be used to identify sounds in the surrounding environment (e.g., sirens, human speech, animal sounds, alarms, etc.) upon which control strategy for vehicle 200 may be based. For example, if the acoustic sensor detects a siren (e.g., an ambulatory siren, a fire engine siren, etc.), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1, etc.). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 2A:
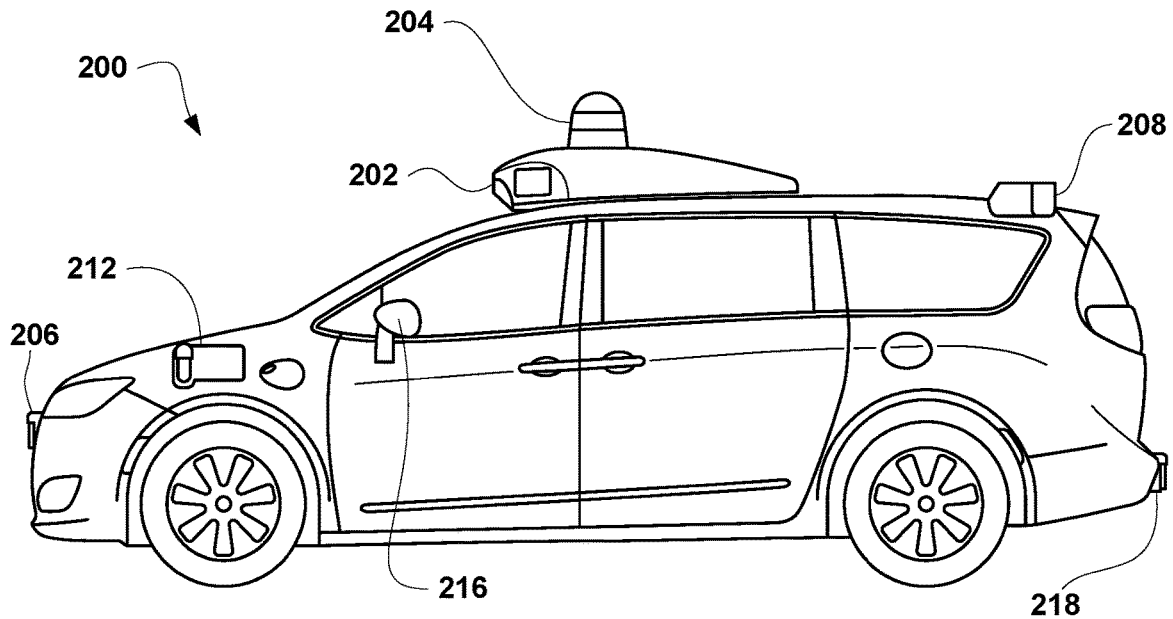
FIG. 2A is an illustration of a physical configuration of a vehicle, according to example embodiments.
Figure 2B:
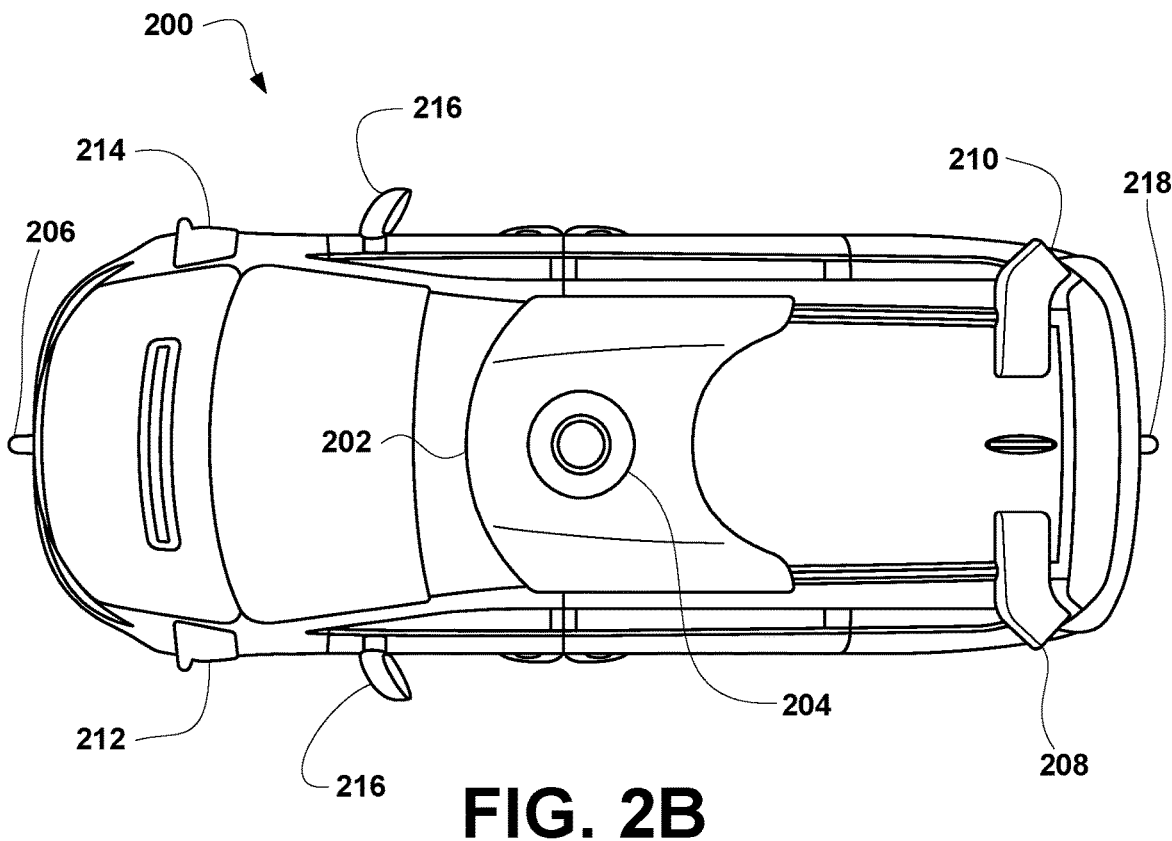
FIG. 2B is an illustration of a physical configuration of a vehicle, according to example embodiments.
Figure 2C:
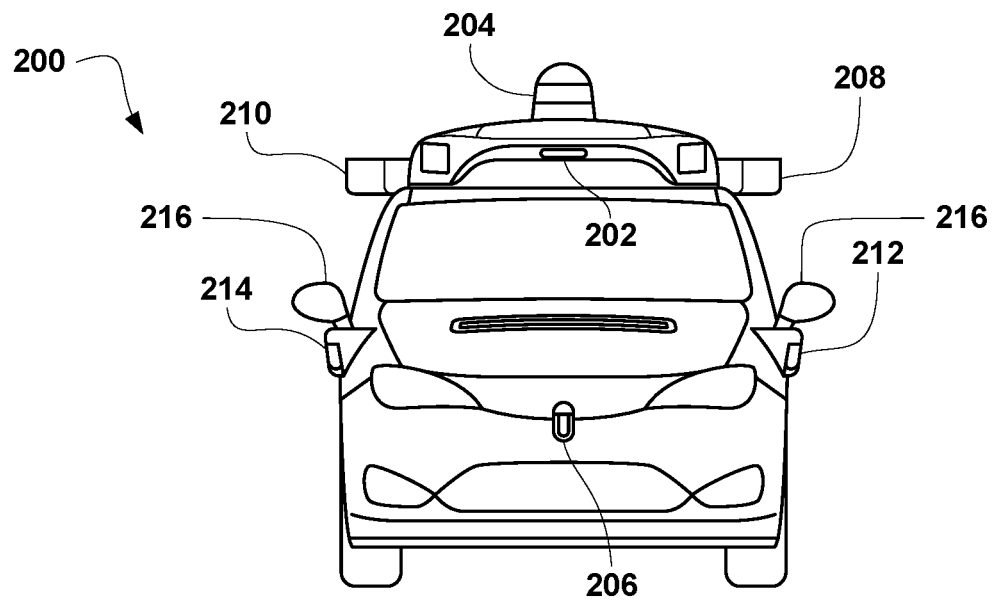
FIG. 2C is an illustration of a physical configuration of a vehicle, according to example embodiments.
Figure 2D:
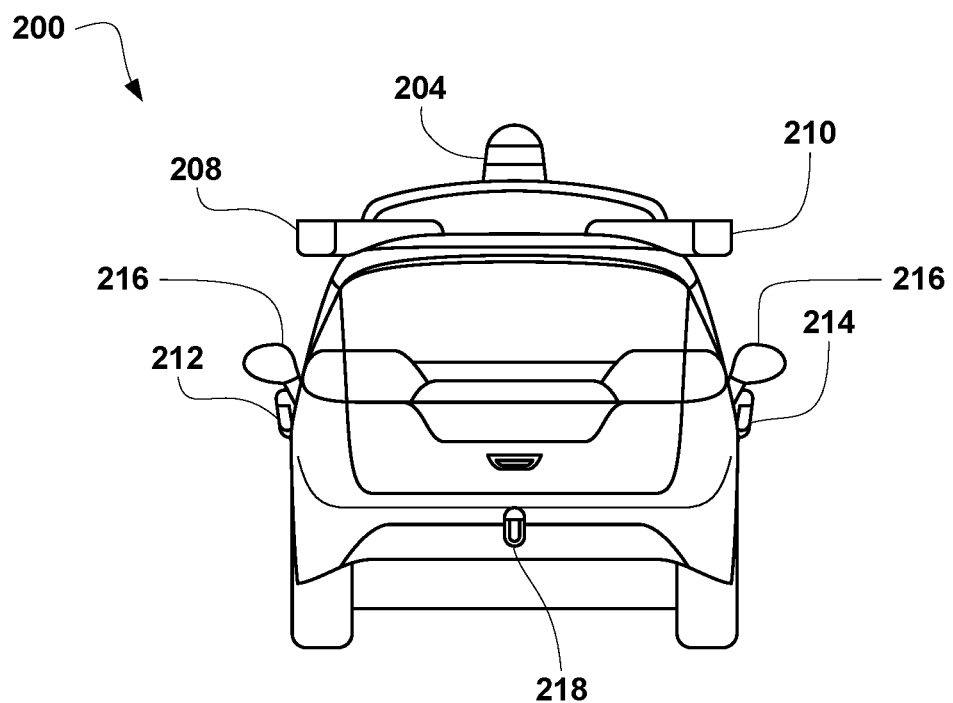
FIG. 2D is an illustration of a physical configuration of a vehicle, according to example embodiments.
Figure 2E:
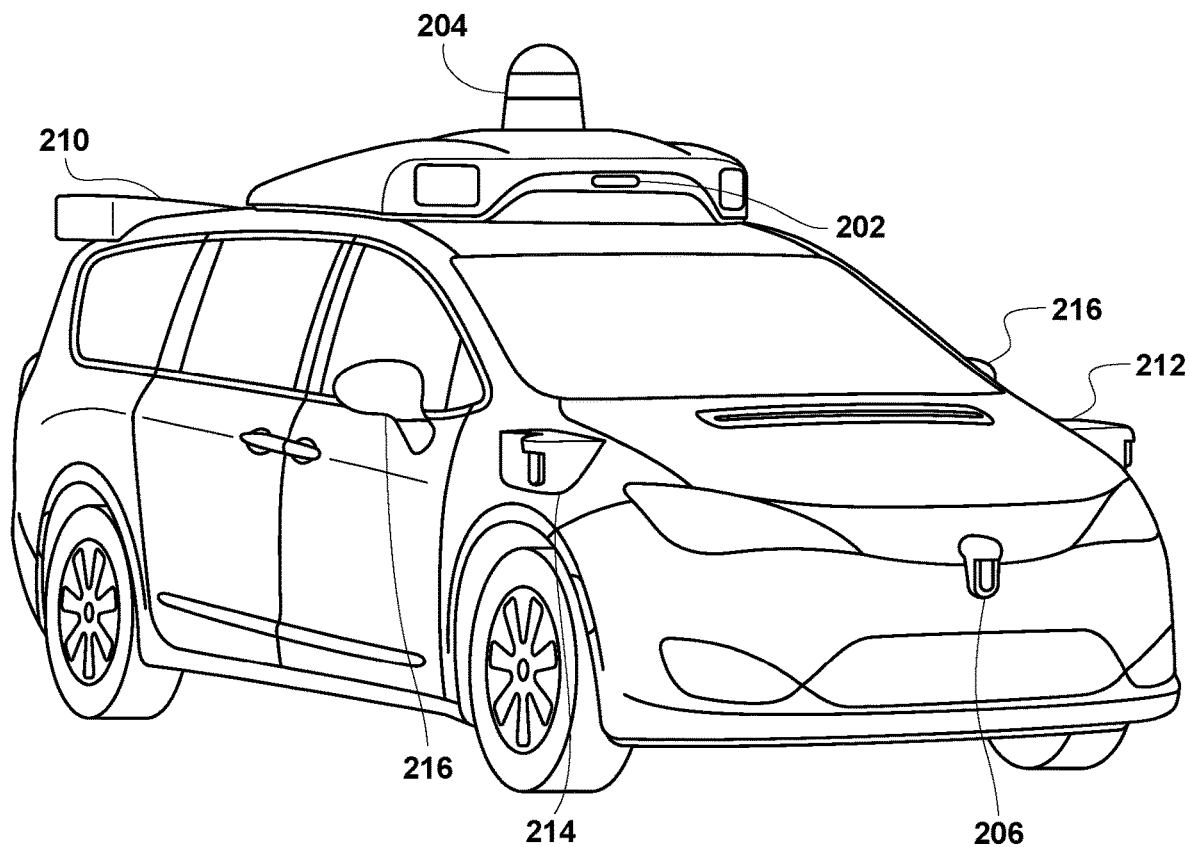
FIG. 2E is an illustration of a physical configuration of a vehicle, according to example embodiments.
Figure 2F:
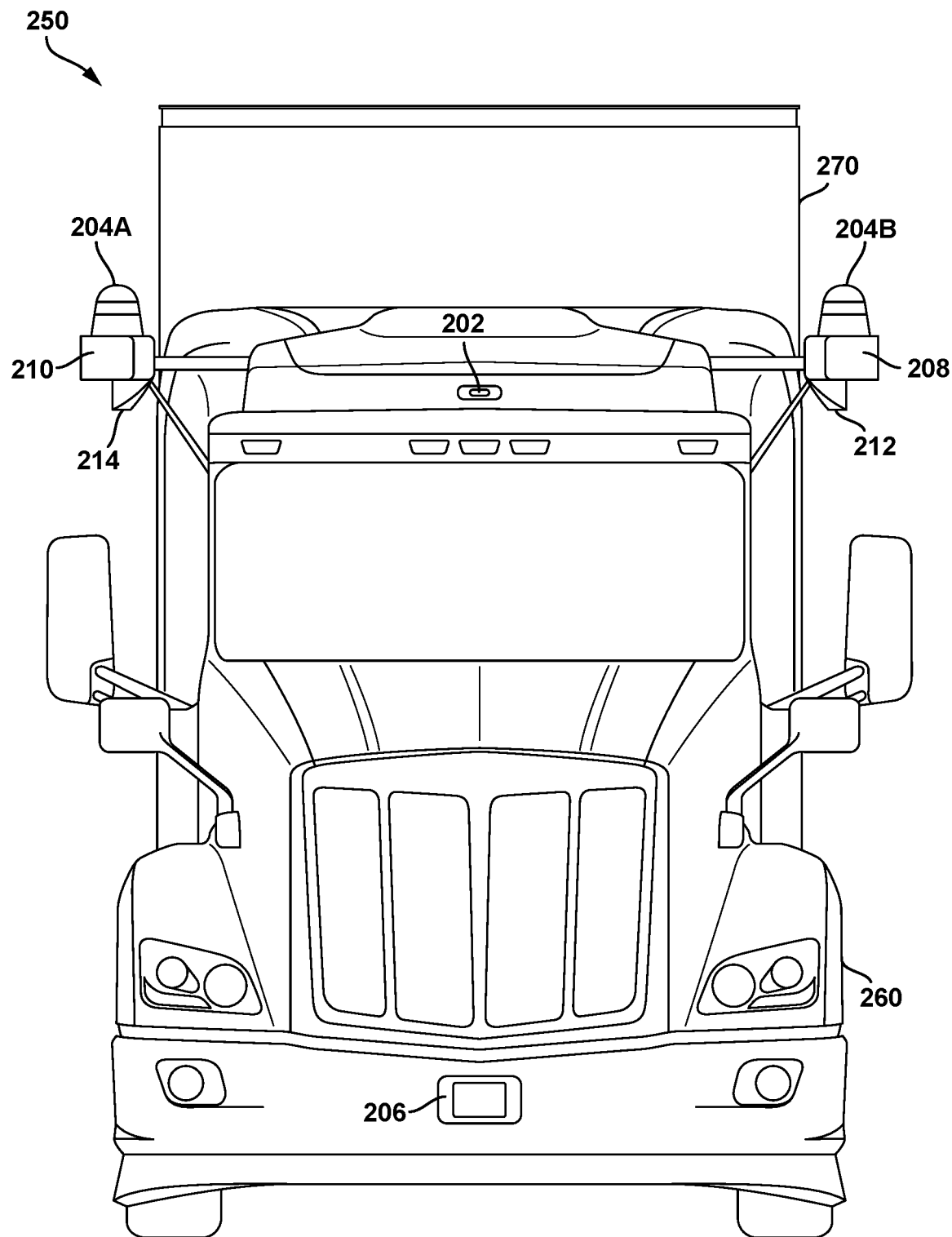
FIG. 2F is an illustration of a physical configuration of a vehicle, according to example embodiments.
Figure 2G:
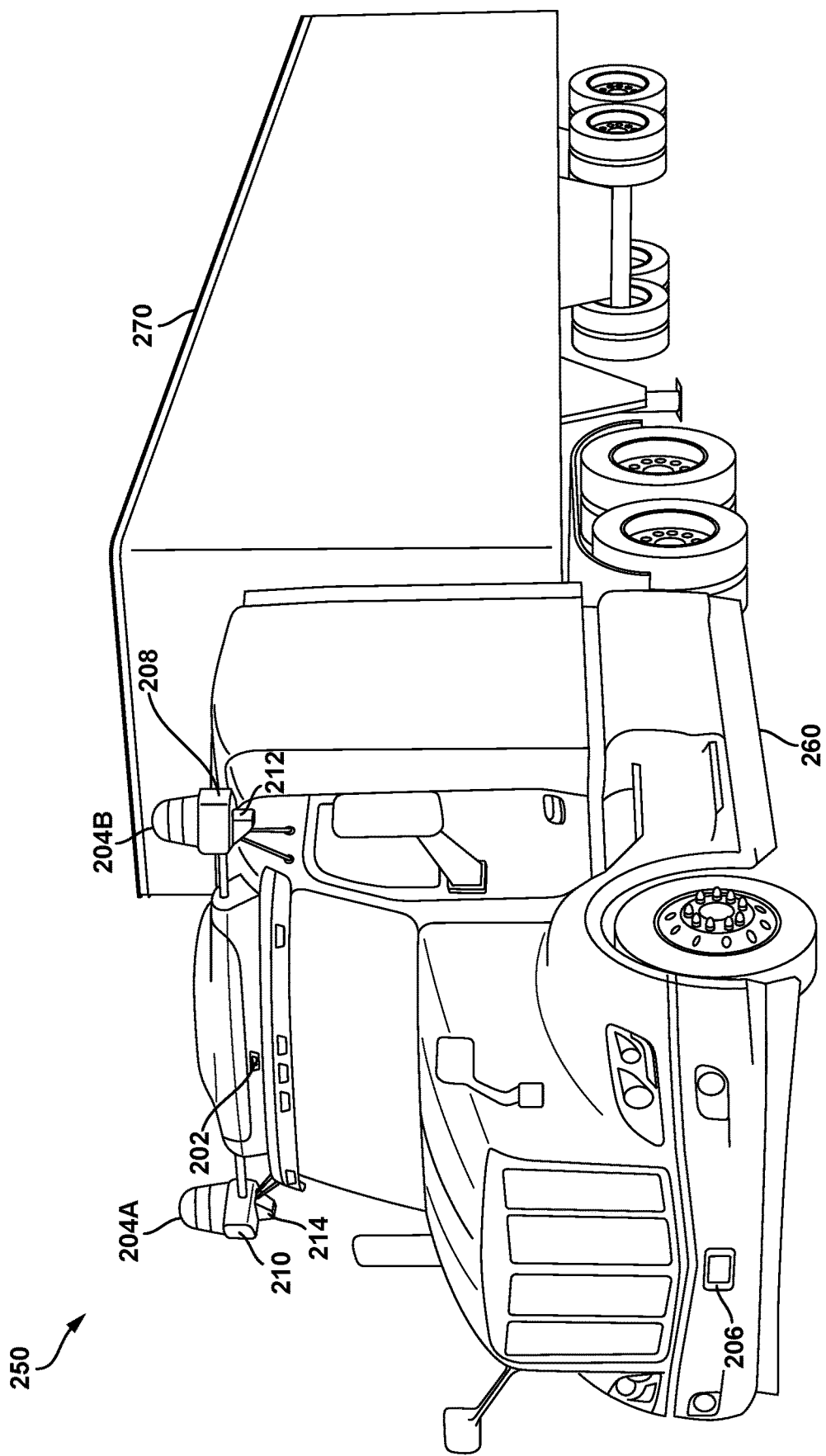
FIG. 2G is an illustration of a physical configuration of a vehicle, according to example embodiments.
Figure 2H:
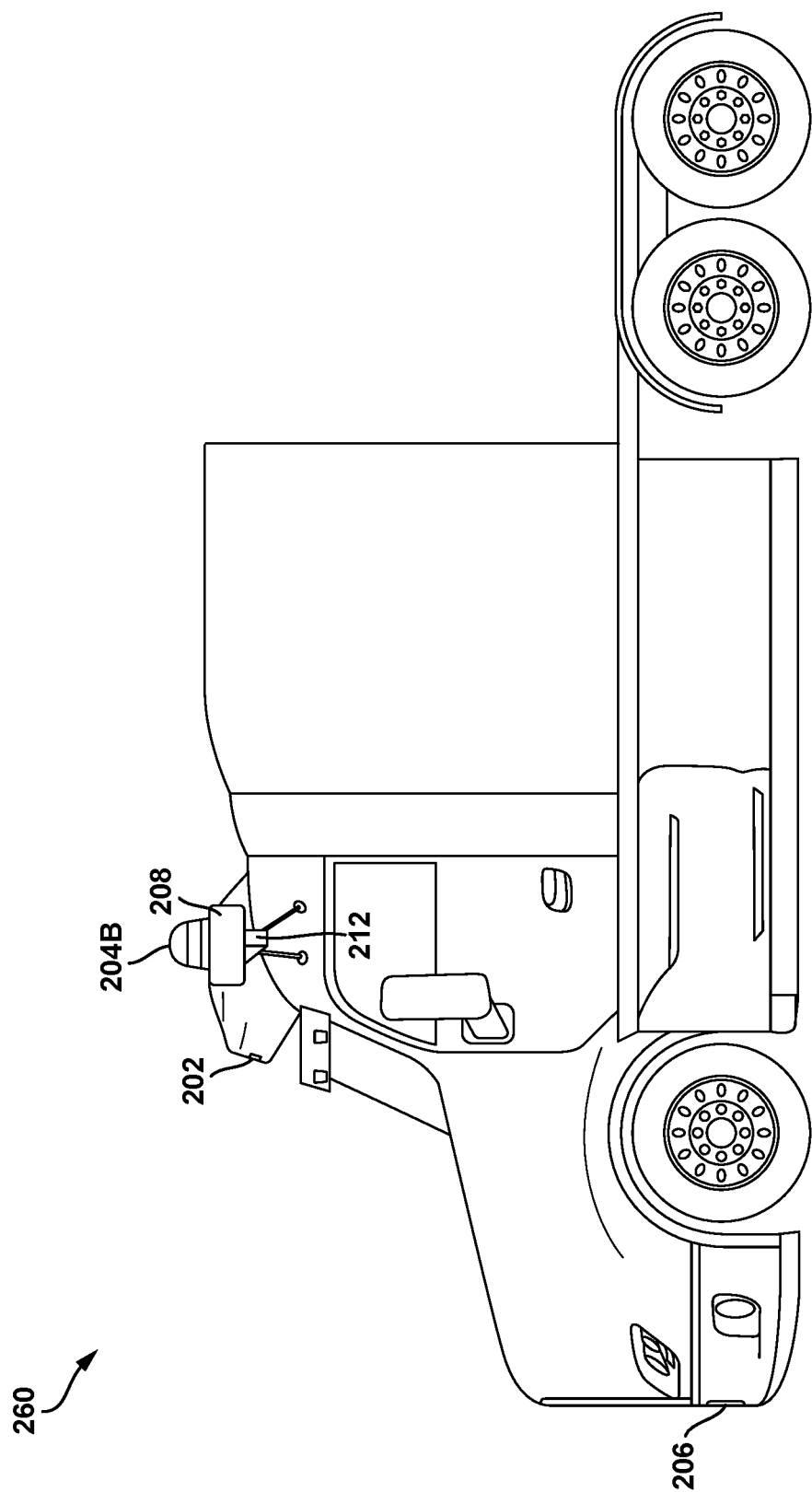
FIG. 2H is an illustration of a physical configuration of a vehicle, according to example embodiments.
Figure 2I:
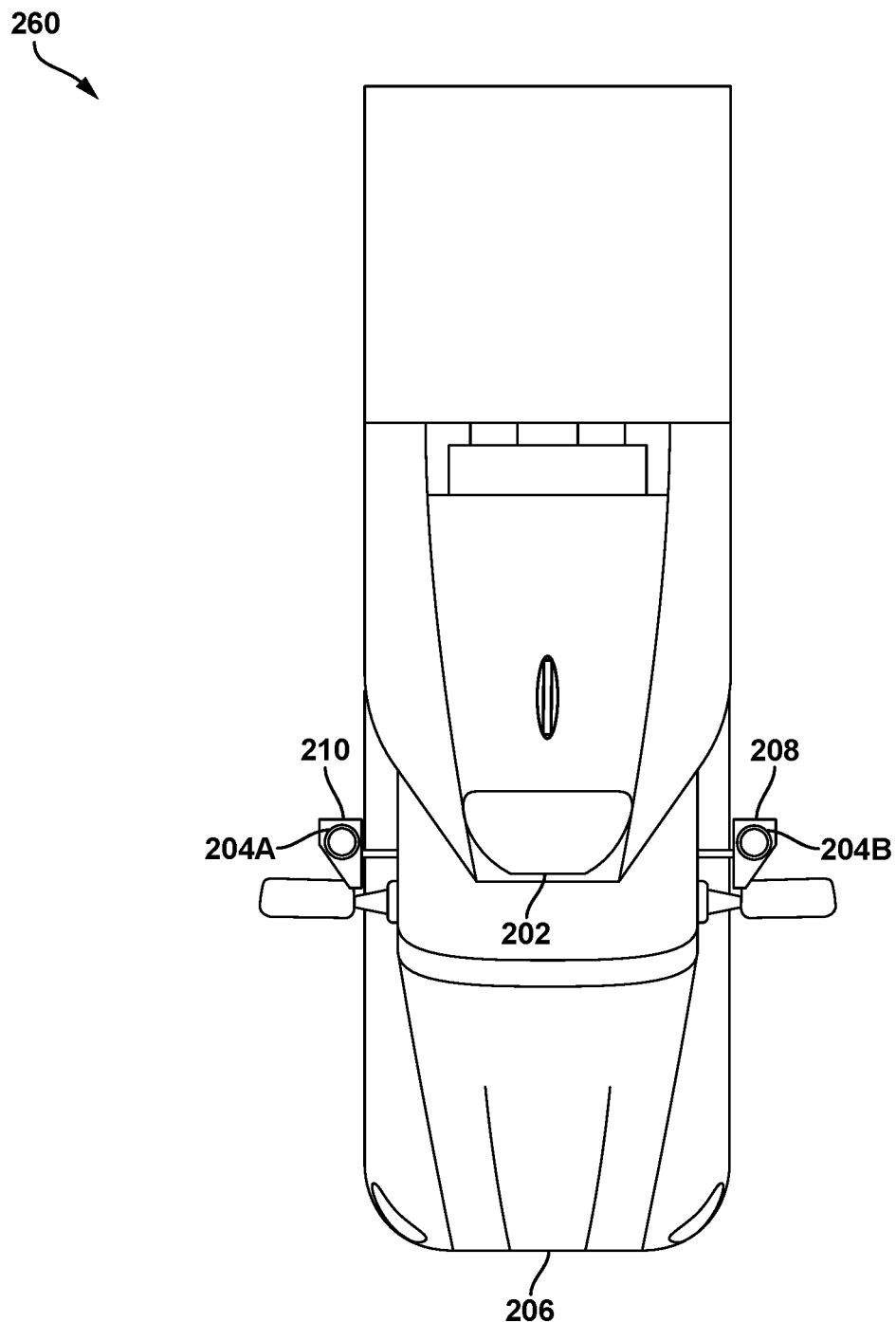
FIG. 2I is an illustration of a physical configuration of a vehicle, according to example embodiments.

As described above, in some embodiments, the vehicle 200 may take the form of a van, but alternate forms are also possible and are contemplated herein. As such, FIGS. 2F-2I illustrate embodiments where a vehicle 250 takes the form of a semi-truck. For example, FIG. 2F illustrates a front-view of the vehicle 250 and FIG. 2G illustrates an isometric view of the vehicle 250. In embodiments where the vehicle 250 is a semi-truck, the vehicle 250 may include a tractor portion 260 and a trailer portion 270 (illustrated in FIG. 2G). FIGS. 2H and 2I provide a side view and a top view, respectively, of the tractor portion 260. Similar to the vehicle 200 illustrated above, the vehicle 250 illustrated in FIGS. 2F-2I may also include a variety of sensor systems (e.g., similar to the sensor systems 202, 206, 208, 210, 212, 214 shown and described with reference to FIGS. 2A-2E). In some embodiments, whereas the vehicle 200 of FIGS. 2A-2E may only include a single copy of some sensor systems (e.g., the sensor system 204), the vehicle 250 illustrated in FIGS. 2F-2I may include multiple copies of that sensor system (e.g., the sensor systems 204A and 204B, as illustrated).

While drawings and description throughout may reference a given form of vehicle (e.g., the semi-truck vehicle 250 or the van vehicle 200), it is understood that embodiments described herein can be equally applied in a variety of vehicle contexts (e.g., with modifications employed to account for a form factor of vehicle). For example, sensors and/or other components described or illustrated as being part of the van vehicle 200 could also be used (e.g., for navigation and/or obstacle detection and avoidance) in the semi-truck vehicle 250

FIG. 2J illustrates various sensor fields of view (e.g., associated with the vehicle 250 described above). As described above, vehicle 250 may contain a plurality of sensors/sensor units. The locations of the various sensors may correspond to the locations of the sensors disclosed in FIGS. 2F-2I, for example. However, in some instances, the sensors may have other locations. Sensors location reference numbers are omitted from FIG. 2J for simplicity of the drawing. For each sensor unit of vehicle 250, FIG. 2J illustrates a representative field of view (e.g., fields of view labeled as 252A, 252B, 252C, 252D, 254A, 254B, 256, 258A, 258B, and 258C). The field of view of a sensor may include an angular region (e.g., an azimuthal angular region and/or an elevational angular region) over which the sensor may detect objects.

Figure 2K:
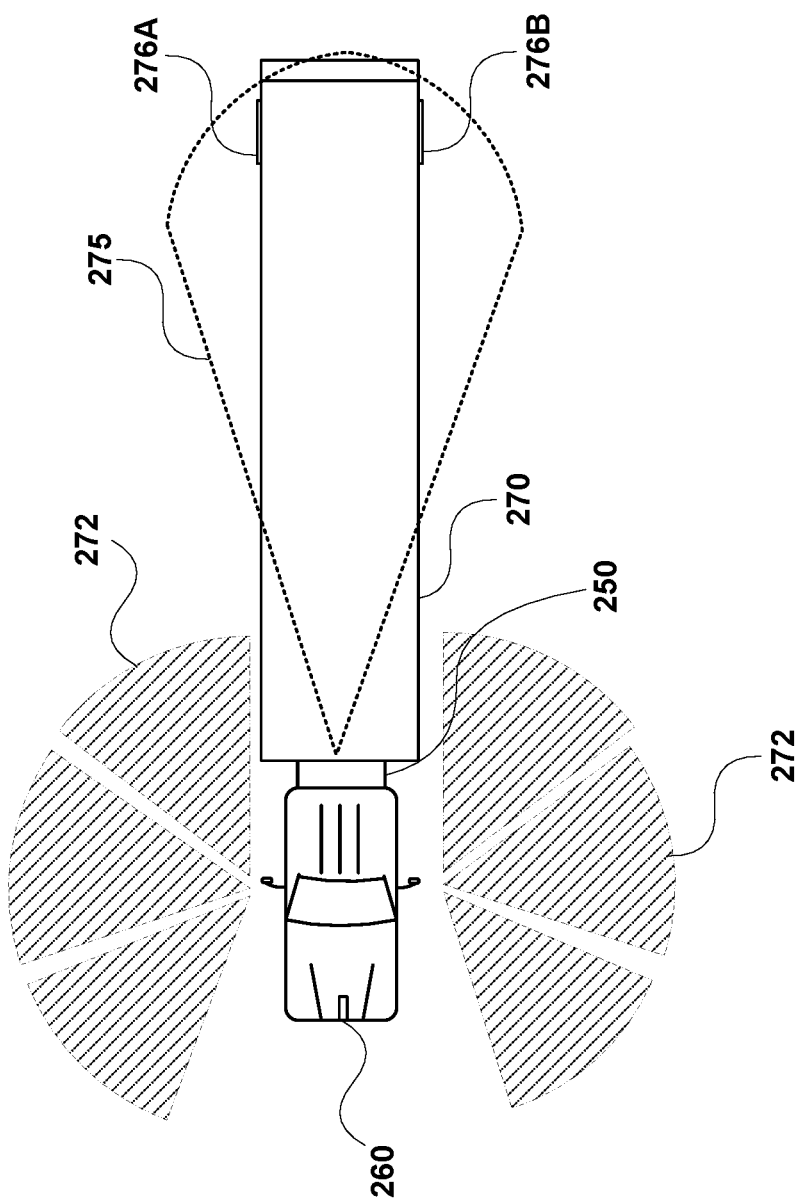
FIG. 2K is an illustration of beam steering for a sensor, according to example embodiments.

FIG. 2K illustrates beam steering for a sensor of a vehicle (e.g., the vehicle 250 shown and described with reference to FIGS. 2F-2J), according to example embodiments. In various embodiments, a sensor unit of vehicle 250 may be a radar, a lidar, a sonar, etc. Further, in some embodiments, during the operation of the sensor, the sensor may be scanned within the field of view of the sensor. Various different scanning angles for an example sensor are shown as regions 272, which each indicate the angular region over which the sensor is operating. The sensor may periodically or iteratively change the region over which it is operating. In some embodiments, multiple sensors may be used by vehicle 250 to measure regions 272. In addition, other regions may be included in other examples. For instance, one or more sensors may measure aspects of the trailer 270 of vehicle 250 and/or a region directly in front of vehicle 250.

At some angles, region of operation 275 of the sensor may include rear wheels 276A, 276B of trailer 270. Thus, the sensor may measure rear wheel 276A and/or rear wheel 276B during operation. For example, rear wheels 276A, 276B may reflect lidar signals or radar signals transmitted by the sensor. The sensor may receive the reflected signals from rear wheels 276A, 276. Therefore, the data collected by the sensor may include data from the reflections off the wheel.

In some instances, such as when the sensor is a radar, the reflections from rear wheels 276A, 276B may appear as noise in the received radar signals. Consequently, the radar may operate with an enhanced signal to noise ratio in instances where rear wheels 276A, 276B direct radar signals away from the sensor.

Figure 3:
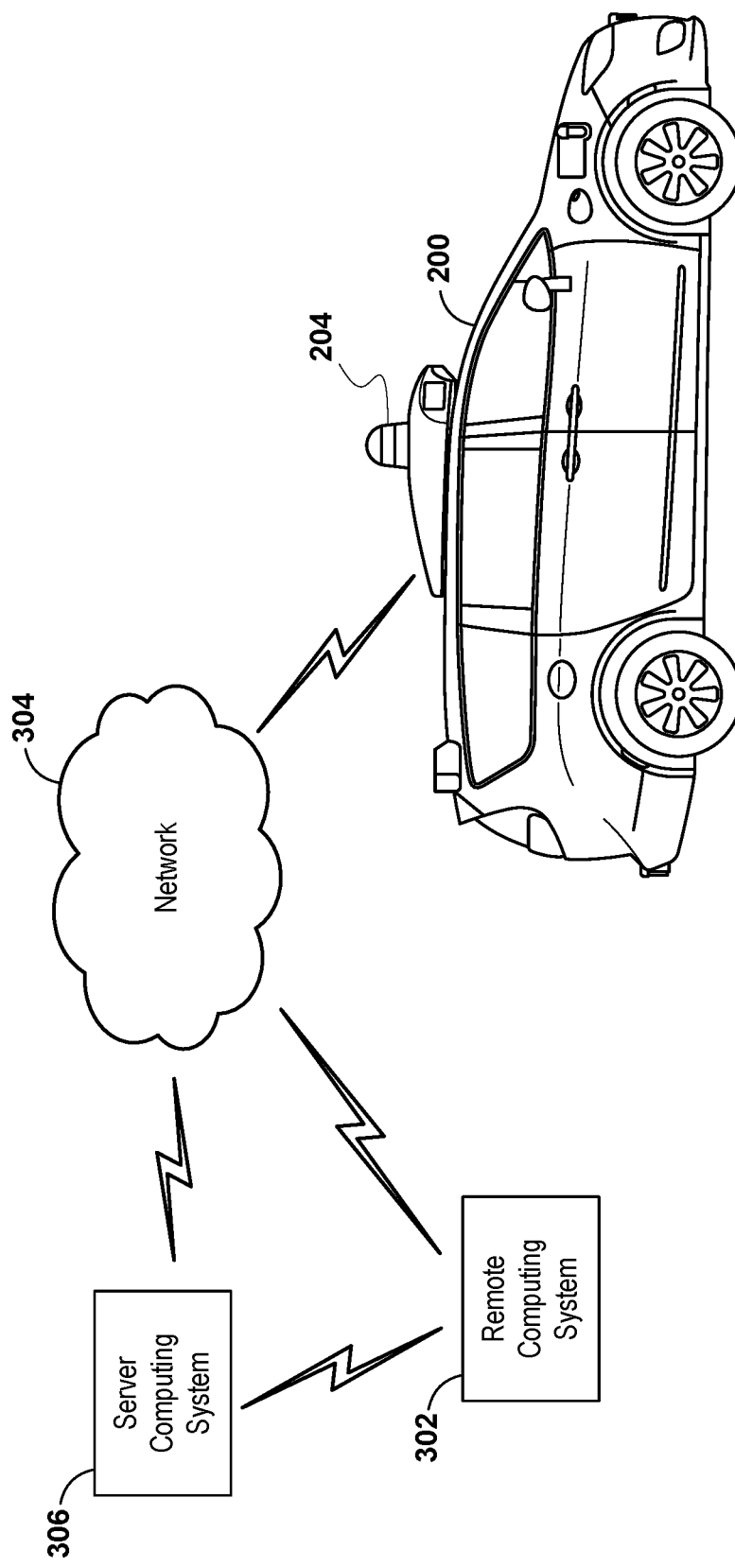
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone, etc.), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, a computing system local to vehicle 200, etc.) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200, etc.) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environment data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light, etc.) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals, etc.), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present, etc.), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign, etc.), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304, etc.), and in some embodiments, via a server (e.g., server computing system 306, etc.). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction, etc.), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign, etc.), but may be configured to request remote assistance at the same time as (or at a later time from) when the vehicle operates in accordance with the detected object.

Figure 4:
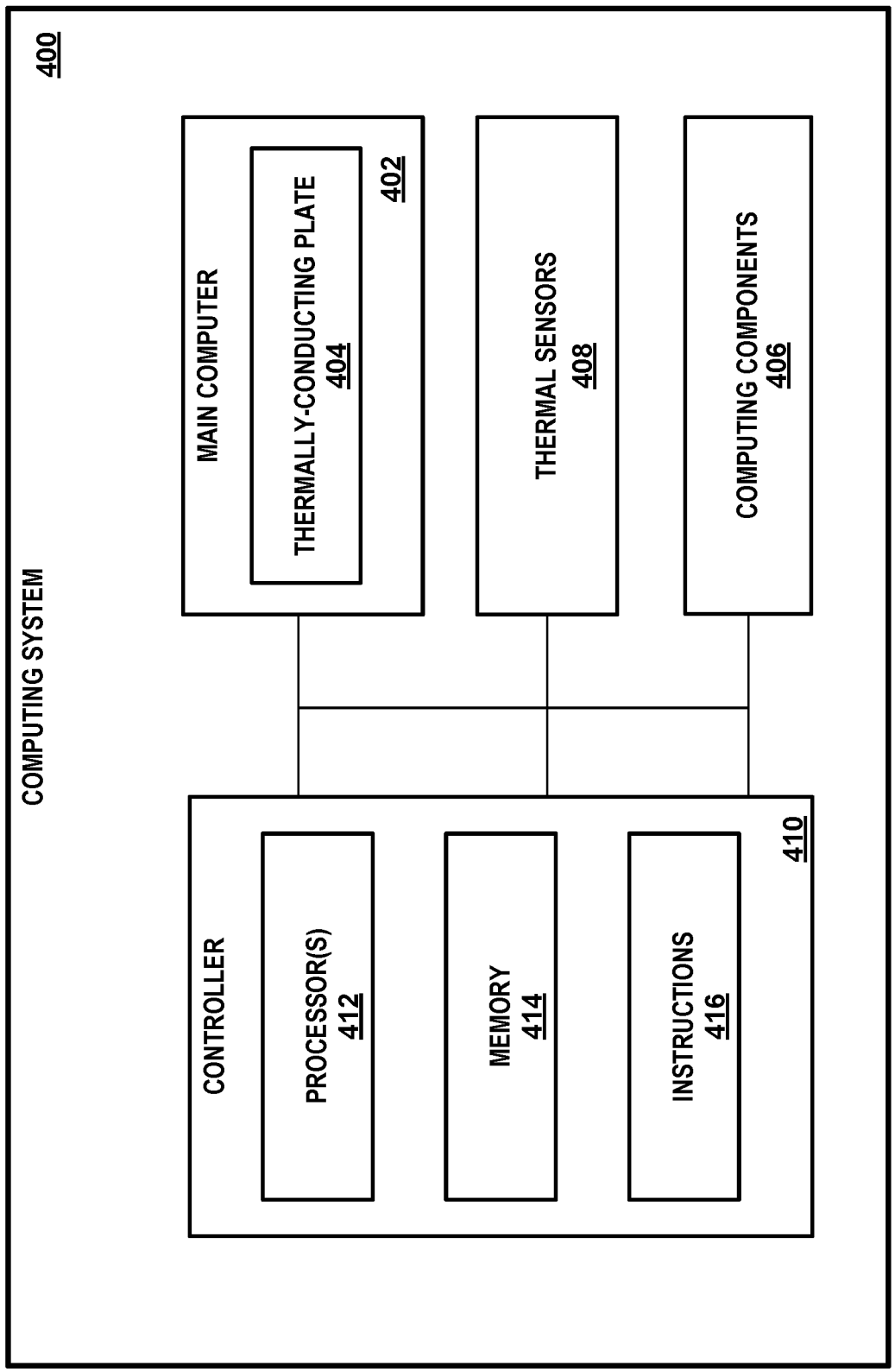
FIG. 4 is an illustration of a computing system, according to an example embodiment.

FIG. 4 illustrates a computing system 400, according to an example embodiment. As previously mentioned, the computing system 400 can be a component of the vehicle. The computing system 400 can be mounted to the vehicle, for example, in a rear portion of the vehicle, such as in a trunk. The computing system 400 includes a main computer 402. In an example embodiment, main computer 402 can be computer system 112 previously described. The main computer 402 can further include a thermally-conducting plate 404. In an example embodiment, the thermally conducting plate can include an air-cooled plate, a heat spreader, or liquid-cooled plate. In an example embodiment the thermally-conducting plate can also be made from a thermally conductive material such as copper-tungsten, silicon carbide in aluminum matrix, diamond in copper-silver alloy matrix, and/or beryllium oxide in beryllium matrix. The thermally-conducting plate 404 can include a plate structure with a first side and a second side opposite the first side. A plurality of computing components 406 can be positioned on both the first side and the second side of the thermally-conducting plate, or on only one of the sides. The plurality of components 406 can be coupled to the main computer 402 via the thermally-conducting plate 404. A plurality of thermal sensors 408 can be coupled to the thermally-conducting plate 404 to monitor the temperature of the thermally conducting plate 404 and the plurality of computing components 406 coupled to the thermally conducting plate 404.

In an example embodiment, the air-cooled plate can be configured so that air can flow through the plate (e.g., blown through the plate) to assist in cooling. For example, the air-cooled plate can be hollow, or can include a plurality of channels for air to flow through. The plurality of thermal sensors can be coupled to the air-cooled plate to monitor the temperature of the air-cooled plate and the plurality of computing components coupled to the air-cooled plate.

In an example embodiment, the heat spreader can be configured so that heat is dissipated through it to assist in heating and/or cooling. The heat spreader can be a heat sink that includes a plurality of structural features such as a plurality of fins or a plurality of posts to dissipate heat. The plurality of fins and the plurality of posts may assist in maximizing the surface area of the heat sink in contact with a medium surrounding it. The plurality of thermal sensors can be coupled to the heat spreader to monitor the temperature of the heat spreader and the plurality of computing components coupled to the heat spreader.

In an example embodiment, the liquid-cooled plate can be configured so that liquid can flow through the plate (e.g., pumped through the plate) to assist in cooling. For example, the liquid-cooled plate can be hollow, or can include a plurality of channels for liquid to flow through. The plurality of thermal sensors can be coupled to the liquid-cooled plate to monitor the temperature of the liquid-cooled plate and the plurality of computing components coupled to the liquid-cooled plate.

The computing system 400 additionally includes a controller 410. In some embodiments, the controller 410 could be a read-out integrated circuit (ROIC) that is electrically-coupled to the main computer 402. The controller 410 includes at least one of a field-programmable gate array (FPGA) or an application-specific integrated circuit (ASIC). Additionally or alternatively, the controller 410 may include one or more processors 412 and a memory 414. The one or more processors 412 may include a general-purpose processor (e.g., having a single core or multiple cores, etc.) and/or a special-purpose processor (e.g., digital signal processors, etc.). The one or more processors 412 may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein. The one or more processors 412 may be configured to execute computer-readable program instructions that are stored in the memory 414. In some embodiments, the one or more processors 412 may execute the program instructions to provide at least some of the functionality and operations described herein.

The memory 414 may include or take the form of one or more computer-readable storage media that may be read or accessed by the one or more processors 412. The one or more computer-readable storage media can include volatile and/or non-volatile storage components, such as optical, magnetic, organic, solid state memory or other memory or disc storage, which may be integrated in whole or in part with at least one of the one or more processors 412. In some embodiments, the memory 414 may be implemented using a single physical device (e.g., one optical, magnetic, organic solid state memory or other memory or disc storage unit), while in other embodiments, the memory 414 can be implemented using two or more physical devices.

As noted, the memory 414 may include computer-readable program instructions that relate to operations of computing system 400. The at least one processor 412 executes instructions 416 stored in the at least one memory 414 to carry out operations.

The operations include a heating routine. The heating routine can include receiving, at one or more computing components of the plurality of computing components 406, a set of program instructions. The program instructions can include at least one of an instruction to perform a synthetic workload, an instruction to control switching activity on and off, an instruction to apply greater voltage, or an overclocking instruction.

The operations can also include running the set of program instructions on the at least one computing component, wherein running the set of program instructions on the at least one computing component generates heat that flows to the main computer 402 via the thermally-conducting plate 404.

The operations can additionally include detecting, from at least one thermal sensor 408 coupled to the thermally-conducting plate 404, a temperature reading indicative of a temperature of the main computer 402.

The operations can further include determining that the temperature reading has reached a predetermined temperature threshold and based on the temperature reading reaching the predetermined temperature threshold, powering on the main computer 402.

Figure 5:
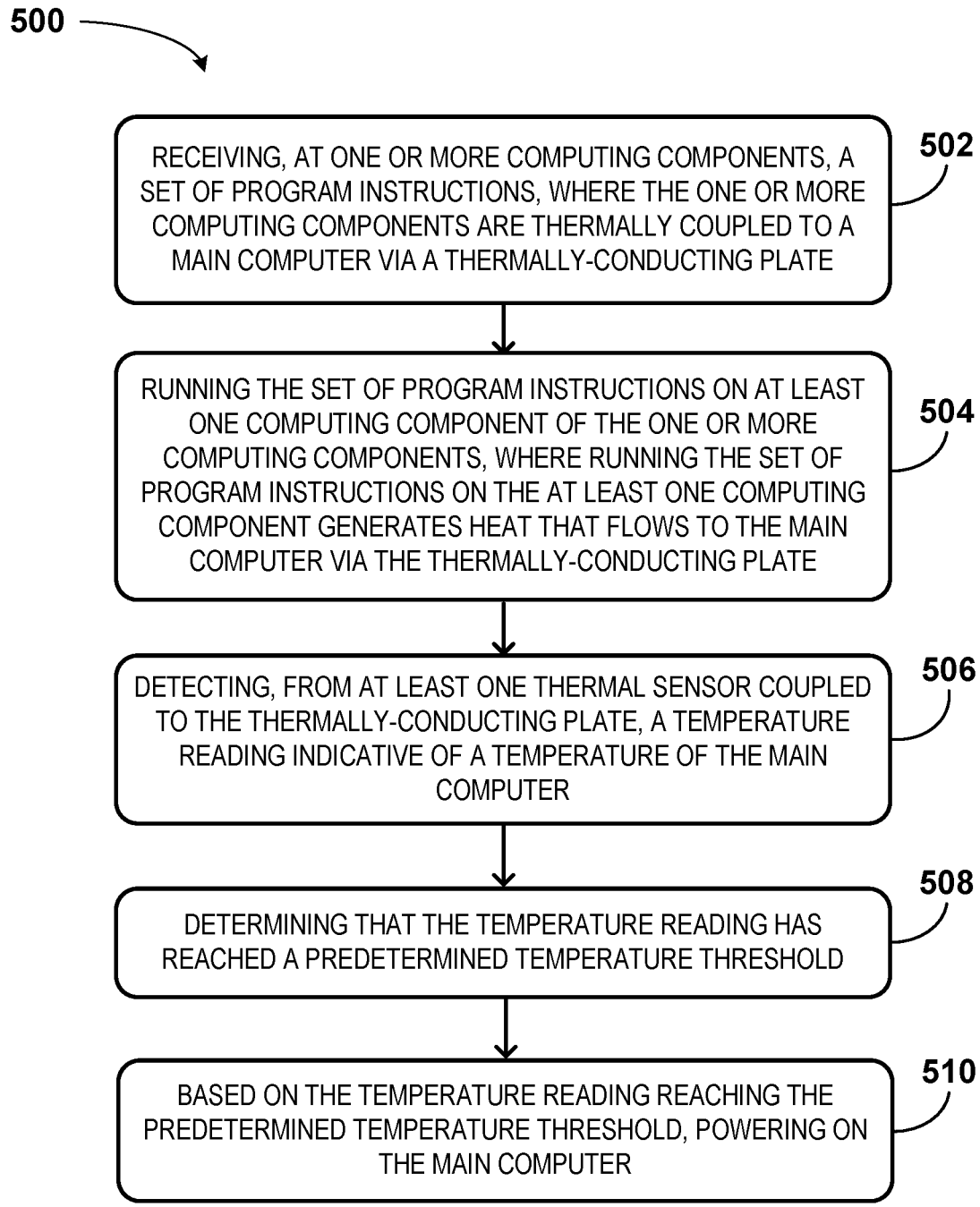
FIG. 5 is an illustration of a method, according to an example embodiment.

FIG. 5 is a flowchart diagram of a method 500, according to example embodiments. One or more blocks of the method 500 may be performed by the computer system 112 illustrated in FIG. 1 (also the computing system 400), in various embodiments. In some embodiments, one or more of the blocks of the method 500 may be performed by a computing device (e.g., a controller of one or more components of the computing system 400, etc.). The computing device may include computing components such as a non-volatile memory (e.g., a hard drive, a read-only memory (ROM), etc.), a volatile memory (e.g., a random-access memory (RAM), such as dynamic random-access memory (DRAM), static random-access memory (SRAM), etc.), a user-input device (e.g., a mouse, a keyboard, etc.), a display (e.g., an LED display, a liquid-crystal display (LCD), etc.), and/or a network communication controller (e.g., a WIFI® controller, based on IEEE 802.11 standards, an Ethernet controller, etc.). The computing device, for example, may execute instructions stored on a non-transitory, computer-readable medium (e.g., a hard drive, etc.) to perform one or more of the operations contemplated herein.

At block 502, the method 500 can include receiving, at one or more computing components, a set of program instructions. The one or more computing components can be thermally coupled to a main computer via a thermally-conducting plate. The thermally-conducting plate can include an air-cooled plate, a heat spreader, or liquid-cooled plate. At block 504, the method can include running the set of program instructions on at least one computing component of the one or more computing components. Running the set of program instructions on the at least one computing component can generate heat that flows to the main computer via the thermally-conducting plate. At block 506 the method can include detecting, from at least one thermal sensor coupled to the thermally-conducting plate, a temperature reading indicative of a temperature of the main computer. At block 508 the method can include determining that the temperature reading has reached a predetermined temperature threshold. At block 510 the method can include based on the temperature reading reaching the predetermined temperature threshold, powering on the main computer.

In some embodiments of the method 500, a computer on the autonomous vehicle can be in an environment that is below a threshold temperature, for example below 0 degrees Celsius. Below the threshold temperature the computer may not be able to boot reliably. However, there may be components of the computer that could boot below the threshold temperature to heat the computer. In an example embodiment, one or more computing components can be thermally coupled to a main computer via a thermally-conducting plate. The thermally-conducting plate can have two sides and the computing components can be coupled to both sides of the cold plate. A thermal interface material, such as silicone, can also be coupled to the thermally-conducting plate and the computing components to insulate the computing components. In an example where the thermally-conducting plate is a liquid-cooled plate, the liquid-cooled plate may not have any liquid pumping through it before the computer is powered on.

Embodiments of the method 500 can include receiving, at the one or more computing components, a set of program instructions. In an example embodiment, the set of program instructions can be received from a microprocessor. Although the computer on the vehicle may not be able to boot below the threshold temperature, the microprocessor may operate below the threshold temperature and may be in communication with the at least one or more computing components. Thus, the microprocessor could be booted with the components of the computer that could boot below the threshold temperature.

Once the program instructions are received, method 500 can include running the set of program instructions on at least one computing component of the one or more computing components. The at least one component can include an integrated circuit (IC). The integrated circuit can be a processing chip used to process sensor data from one or more sensors (e.g., camera data, radar data, lidar data, microphone data, camera data and radar data, camera data and lidar data, radar and lidar data, etc.). In an example embodiment, multiple of these ICs could be coupled to the thermally-conducting plate. For example, six ICs could be coupled to each side of the thermally-conducting plate. Other numbers of ICs are also possible.

Running the set of program instructions on the at least one computing component can generate heat. In an example embodiment, the set of program instructions include at least one of: (i) an instruction to perform a synthetic workload, (ii) an instruction to control switching activity on and off, (iii) an instruction to apply greater voltage, or (iv) an overclocking instruction. These program instructions can be run separately, or in any combination with each other in an attempt to generate greater heat.

In an example embodiment, the instruction to perform the synthetic workload can include an arithmetically intense workload with data patterns selected to maximize switching activity. An arithmetically intense workload can include matrix multipliers with intermediate results that switch between zeroes and ones.

In an example embodiment, the instruction to control switching activity on and off includes switching a clock tree on and off. Switching workload can be toggling the "clock tree network" of the chip to achieve power dissipation. This can be done by enabling all "clock gates" which are generally used to reduce power consumption by shutting off clocks when idle. A global signal can be used to control all clock gates in the chip (or portions of the chip). One such global signal can be a synchronous reset.

In an example embodiment, the overclocking instruction includes increasing clocking frequency. For example, the clocking frequency can be doubled from 1 GHz to 2 GHz, which can also double the power generated by the at least one computing component. Overclocking linearly scales with the amount of power generated. The faster the switching, the more power can be generated. When overclocking, all the clock gates on the at least one computing component should be open. The global signaling described above can also be used to control all clock gates.

In an example embodiment, by increasing the voltage provided to the at least one computing component, the power generated by the at least one computing component can increase quadratically.

The IC can also include a plurality of blocks. The blocks can each be excited to produce power in different ways. For example, a camera processor block can receive program instructions to process color noise which stresses various processing stages as well as the encoder and decoder, a vector processor can receive matrix multipliers, and a Fast Fourier Transform engine can process white noise. The white noise can be composed of a random signal having equal intensities at different frequencies and can thus increase switching activity of the one or more computing components. Including multiple frequencies can increase power dissipation.

In an example embodiment, the heat generated by the at least one computing component running the set of program instructions can flow to the main computer via the thermally-conducting plate. As previously mentioned, the thermally-conducting plate can be a liquid-cooled plate which is hollow and includes a liquid. Alternatively, the liquid-cooled plate can include channels for a liquid to flow through. The liquid can be any liquid, including but not limited to water or coolant. When in temperatures below a threshold temperature, the liquid may sit in the liquid-cooled plate instead of being pumped through by a pump. The standing liquid can assist in conducting heat. The heat generated by the at least one component can be conducted by the liquid in the liquid-cooled plate so that the heat spreads through the liquid-cooled plate and flows to the main computer, and the computing components of the main computer.

Embodiments of the method 500 can include determining a desired powering-on time of the main computer and running the set of program instructions on the at least one computing component for at least a predetermined amount of time before the desired powering-on time of the main computer. The predetermined amount of time for running the set of program instructions can scale linearly with the amount of power generated by the set of program instructions. For example, the predetermined amount of time may be 45 minutes of overclocking the clock speed by 200% (i.e., doubling the normal clock speed) and switching clock load to raise the temperature from −30 degrees Celsius to 0 degrees Celsius. Overclocking the clock speed by 200% and switching the clock load can generate 200% more power than the computing component not running these program instructions. At −30 degrees Celsius, once the desired powering-on time is determined, the program instructions could start running 45 minutes before powering-on the main computer to generate enough heat to increase the temperature of the main computer to 0 degrees Celsius. In an additional example embodiment, if 300% more power is generated from running the set of program instructions, the predetermined amount of time for running the set of instructions can be decreased from 45 minutes to 30 minutes. For example, overclocking by 300% can increase the power 300% and can reduce the predetermined time to 30 minutes. The predetermined amount of time for running the program instructions can also vary depending on the temperature of the environment. In an additional embodiment, the predetermined amount of time may be 15 minutes to raise the temperature from −10 degrees Celsius to 0 degrees Celsius. However, by combining program instructions the predetermined amount of time can be lowered.

Embodiments of the method 500 can include detecting, from at least one thermal sensor coupled to the thermally-conducting plate, a temperature reading indicative of a temperature of the main computer. In an example embodiment, the thermally-conducting plate includes a plurality of thermal sensors coupled to it and spaced apart on the thermally-conducting plate. The thermal sensors can be used to determine the temperatures of specific portions of the thermally-conducting plate. Particularly, method 500 can include selecting a portion of the main computer and detecting from at least one thermal sensor near the portion of the main computer, a temperature of the portion of the main computer. By selecting the thermal sensors for specific portions of the main computer, accurate temperatures of the computing components can be gathered. In an example embodiment, through thermal modeling, a temperature of a specific computing component can be determined based on the temperature of an associated specific portion of the thermally-conducting plate.

Once the temperature of each portion of the main computer is determined, the temperature of the main computer can be determined in a plurality of ways. In an example embodiment, detecting, from at least one thermal sensor coupled to the liquid-cooled plate, the temperature reading indicative of the temperature of the main computer can be accomplished by detecting the temperatures for each specific portion of the main computer and determining a minimum temperature detected. An additional embodiment can include, detecting, from the plurality of thermal sensors coupled to the liquid-cooled plate, an average temperature reading indicative of the temperature of the main computer. In this embodiment, the temperatures for each specific portion of the main computer can be detected, and an average can be determined. The average temperature can be considered the temperature of the main computer.

Embodiments of the method 500 can include determining that the temperature reading has reached a predetermined temperature threshold based on the sensed temperatures. In an example embodiment, the predetermined temperature threshold can be 0 degrees Celsius. However, the predetermined temperature threshold can be programmable. For example, the predetermined temperature threshold can be 5 degrees Celsius to provide a buffer for powering-on the main computer.

Embodiments of the method 500 can include, based on the temperature reading reaching the predetermined temperature threshold, powering on the main computer. Once the main computer is powered on, the at least one computing component may cease to run the program instructions. Instead, based on the temperature reading reaching the predetermined temperature threshold, a second set of program instructions can be run on the at least one computing component. For example, the at least one computing component can begin processing data from one or more sensors.

Embodiments of the method 500 can further include, based on the temperature reading, reaching a second predetermined temperature threshold and flowing liquid through the liquid-cooled plate. Once the main computer is powered-on, the at least one computing component may cease to run the program instructions to generate heat. However, the system may not immediately begin cooling operations. Instead, the thermal sensors may be used to monitor the temperature of the main computer, as previously described. Once the temperature reaches a second predetermined temperature threshold the system may begin cooling the main computer by activating pumps which may pump liquid through the liquid-cooled plate.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   receiving, at one or more integrated circuits, a set of program instructions, wherein the one or more integrated circuits are thermally coupled to a main computer via a liquid-cooled plate;
   running the set of program instructions on at least one integrated circuit of the one or more integrated circuits, wherein the one or more integrated circuits generate heat when running the set of program instructions, and wherein the generated heat flows into the liquid-cooled plate and to the main computer via the liquid-cooled plate;
   detecting, from at least one thermal sensor coupled to the liquid-cooled plate, a temperature reading indicative of a temperature of the main computer;
   determining that the temperature reading has reached a predetermined temperature threshold; and
   based on the temperature reading reaching the predetermined temperature threshold, powering on the main computer.

2. The method of claim 1, wherein the set of program instructions comprises at least one of an instruction to perform a synthetic workload, an instruction to control switching activity on and off, an instruction to apply greater voltage, or an overclocking instruction.

3. The method of claim 2, wherein the instruction to perform the synthetic workload comprises an arithmetically intense workload, wherein the instruction to control switching activity on and off comprises switching a clock tree on and off, and wherein the overclocking instruction comprises increasing clocking frequency.

4. The method of claim 1, further comprising based on the temperature reading reaching the predetermined temperature threshold, running a second set of program instructions.

5. The method of claim 1, further comprising:
   determining a desired powering-on time of the main computer; and
   running the set of program instructions on the at least one integrated circuit for at least a predetermined amount of time before the desired powering-on time of the main computer.

6. The method of claim 1, further comprising based on the temperature reading reaching a second predetermined temperature threshold, flowing liquid through the liquid-cooled plate.

7. The method of claim 1, further comprising selecting a portion of the main computer, and detecting from at least one thermal sensor near the portion of the main computer, a temperature of the portion of the main computer.

8. The method of claim 1, wherein detecting, from at least one thermal sensor coupled to the liquid-cooled plate, the temperature reading indicative of the temperature of the main computer comprises detecting a minimum temperature.

9. The method of claim 1, further comprising detecting, from a plurality of thermal sensors coupled to the liquid-cooled plate, an average temperature reading indicative of the temperature of the main computer.

10. The method of claim 1, wherein the set of program instructions are received from a microprocessor, wherein the microprocessor operates below a threshold temperature.

11. A non-transitory, computer-readable medium having instructions stored thereon, wherein the instructions, when executed by a processor, cause the processor to execute a method comprising:
- receiving, at one or more integrated circuits, a set of program instructions, wherein the one or more integrated circuits are thermally coupled to a main computer via a liquid-cooled plate;
- running the set of program instructions on at least one integrated circuit of the one or more integrated circuits, wherein the one or more integrated circuits generate heat when running the set of program instructions, and wherein the generated heat flows into the liquid-cooled plate and to the main computer via the liquid-cooled plate;
- detecting, from at least one thermal sensor coupled to the liquid-cooled plate, a temperature reading indicative of a temperature of the main computer;
- determining that the temperature reading has reached a predetermined temperature threshold; and
- based on the temperature reading reaching the predetermined temperature threshold, powering on the main computer.

12. The non-transitory, computer readable medium of claim 11, wherein the set of program instructions comprises at least one of an instruction to perform a synthetic workload, an instruction to control switching activity on and off, an instruction to apply greater voltage, or an overclocking instruction.

13. The non-transitory, computer readable medium of claim 12, wherein the instruction to perform the synthetic workload comprises an arithmetically intense workload, wherein the instruction to control switching activity on and off comprises switching a clock tree on and off, and wherein the overclocking instruction comprises increasing clocking frequency.

14. The non-transitory, computer readable medium of claim 11, further comprising based on the temperature reading reaching a second predetermined temperature threshold, flowing liquid through the liquid-cooled plate.

15. The non-transitory, computer readable medium of claim 11, further comprising selecting a portion of the main computer, and detecting from at least one thermal sensor near the portion of the main computer, a temperature of the portion of the main computer.

16. The non-transitory, computer readable medium of claim 11, wherein detecting, from at least one thermal sensor coupled to the liquid-cooled plate, the temperature reading indicative of the temperature of the main computer comprises detecting a minimum temperature.

17. The non-transitory, computer readable medium of claim 11, further comprising detecting, from a plurality of thermal sensors coupled to the liquid-cooled plate, an average temperature reading indicative of the temperature of the main computer.

18. A computing system comprising:
- a main computer, wherein the main computer comprises a liquid-cooled plate;
- a plurality of integrated circuits thermally coupled to the main computer via the liquid-cooled plate;
- a plurality of thermal sensors coupled to the liquid-cooled plate; and
- a controller configured to perform a heating routine, wherein the heating routine comprises:
  - receiving, at one or more integrated circuits of the plurality of integrated circuits, a set of program instructions;
  - running the set of program instructions on one or more integrated circuits, wherein the one or more integrated circuits generate heat when running the set of program instructions, and wherein the generated heat flows into the liquid-cooled plate and to the main computer via the liquid-cooled plate;
  - detecting, from at least one thermal sensor coupled to the liquid-cooled plate, a temperature reading indicative of a temperature of the main computer;
  - determining that the temperature reading has reached a predetermined temperature threshold; and
  - based on the temperature reading reaching the predetermined temperature threshold, powering on the main computer.

19. The method of claim 1, wherein the liquid-cooled plate comprises a first side and a second side, wherein the main computer is thermally coupled to at least one of the first side or the second side of the liquid-cooled plate, and wherein the one or more integrated circuits are coupled to the first side and the second side of the liquid-cooled plate.

20. The method of claim 1, wherein the set of program instructions is received at the one or more integrated circuits when the main computer is at a temperature of zero degrees Celsius or below, and wherein the at least one integrated circuit begins to run the set of program instructions at the temperature of zero degrees Celsius or below.

* * * * *